(12) United States Patent
McGinnis

(10) Patent No.: US 6,391,205 B1
(45) Date of Patent: May 21, 2002

(54) OSMOTIC DESALINIZATION PROCESS

(76) Inventor: Robert Lloyd McGinnis, P.O. Box 203034, New Haven, CT (US) 06520

( * ) Notice: Subject to any disclaimer, the term of this patent is extended or adjusted under 35 U.S.C. 154(b) by 0 days.

(21) Appl. No.: 09/601,835

(22) Filed: Aug. 4, 2000

Related U.S. Application Data

(63) Continuation-in-part of application No. 09/020,975, filed on Feb. 9, 1998, now abandoned.

(51) Int. Cl.⁷ .......................... B01D 11/00; B01D 61/00
(52) U.S. Cl. ..................... 210/644; 210/642; 210/652; 23/306
(58) Field of Search ................. 210/644, 652, 210/642, 180, 181, 182, 188, 177, 651, 195.1, 195.2, 641; 23/306; 159/DIG. 27, DIG. 28; 203/DIG. 17

(56) References Cited

U.S. PATENT DOCUMENTS 3,171,799 A * 3/1965 Batchelder
3,617,547 A * 11/1971 Halff
3,978,344 A * 8/1976 Jellinek

FOREIGN PATENT DOCUMENTS

DE 2553623 * 8/1976

OTHER PUBLICATIONS

Souririjan, S. "Reverse Osmosis". New York: Academic Press, Inc, pp. 552–569.*

* cited by examiner

Primary Examiner—Ana Fortuna
Assistant Examiner—Richard W. Ward

(57) ABSTRACT

Desalinization of seawater is accomplished through the use of a forward osmosis process, which relies on a series of steps involving the opposition of various aqueous solutions across semi-permeable membranes. The process takes advantage of solutes having highly temperature dependent solubilities, as well as the relatively temperature indifferent solubility of NaCl(aq), the primary solute present in seawater. At least one utilized solute has a solubility directly dependent on temperature, and at least one utilized solute has a solubility inversely dependent on temperature.

17 Claims, 4 Drawing Sheets

OSMOTIC DESALINIZATION PROCESS

This application is a continuation-in-part of U.S. application Ser. No. 09/020,975, filed Feb. 9, 1998, now abandoned.

FIELD OF THE INVENTION

The invention pertains to the field of water recovery from aqueous solutions. More particularly, the invention pertains to the desalinization of a saline solution.

BACKGROUND OF THE INVENTION

The economically and energetically practical desalinization of saline solutions has long been a goal of organized society. In fact, there are suggestions found in the Bible, and in writings by the ancient Greeks, that suggest knowledge regarding the desalting of brackish waters. The benefits of such a process are obvious and important in a world with both a rapidly increasing population and a relatively static fresh water supply. However, it was not until the nineteenth century in England that the first official studies were made into the possibility and practicality of desalinization and ion exchange.

Milestones in the scientific approach to desalinization include the realization by the German chemist Eichorn, in 1858, that ion exchange reactions are reversible ones. By 1905 German scientist Gans developed a process of softening water on a commercial basis using cation exchange materials. In 1935 two English chemists, Adams and Holmes, produced an ion exchanger. The cation exchanger used was a phenolformaldehyde condensation product and the anion exchanger was a condensation product of polyamines and formaldehyde. These products made possible the near complete removal of all ions, including aqueous sodium chloride ("$NaCl_{(aq)}$"), from water. However, the anion exchanger was unable to remove weak alkaline or silica based acids, and the important chemical species to accomplish the ion reduction were both expensive to produce and difficult to handle.

More recently, various desalinization systems have relied upon phase transformations, electrodialysis, or reverse osmosis techniques which are energetically expensive processes. A semi-permeable membrane, like the cell wall of a bladder, is selective about what it allows through it, generally allowing small molecules like water to pass easily but preventing the passage of many other compounds. With the presence of two solutions, each containing a different concentration of dissolved compounds on either side of the barrier, water will typically move from the side of the more dilute solution to the more concentrated solution. Eventually, osmotic pressure will counter the diffusion process exactly, and equilibrium will form. The process of reverse osmosis, first described by a French scientist in 1748, forces a net flow of water molecules from an aqueous solution with a greater concentration of compounds present within it through a semi-permeable membrane and into a solution with a lower concentration of dissolved compounds In a relatively expensive energy step, high water pressure on the source side is used to "reverse" the natural or forward osmotic process. For example, the desalinization of brackish water typically requires operating pressures within the range of 250 to 500 psi, while seawater desalinization requires operating pressures from 800 to 1000 psi, to obtain potable water as the final product.

Other workers in the field have attempted to provide workable desalinization systems to address the long standing need for an efficient and inexpensive method for the demineralization of water. See for example, Batchelder, U.S. Pat. No. 3,171,799; Glew, U.S. Pat. No. 3,216,930; Halff, U.S. Pat. No. 3,617,547; Frank, U.S. Pat. No. 3,670,897; and Yaeli, U.S. Pat. No. 5,098,575. However, none suggest the type of osmolar and thermal manipulations provided by the instant invention.

Through the use of the osmosis techniques and apparati of the invention described herein, virtually unlimited amounts of water can be made potable for a variety of uses including agricultural uses, commercial uses, and as a source of drinking water. More importantly, the creation of potable water through desalinization can essentially "drought-proof" a given population, region, or industry.

SUMMARY OF THE INVENTION

The present invention teaches a method and apparatus for recovering water from aqueous solutions. In a preferred embodiment, the present invention teaches a forward osmotic process to create potable water from a saline solution through the manipulation of thermal and osmolar conditions of multiple solutions in a series of reactions which result in the passage of $H_2O$ from one solution to another through solvent transfer means, such as semi-permeable membranes.

The invention relates to an osmotic process or method for the extraction of a solvent from a first solution, having a first solute difficult to separate from the solvent, by passing said solvent through a series of intermediate solutions comprising the steps or drawing the first solution into a first heating means to heat the first solution; drawing the first solution into a first chamber that is divided by a first solvent transfer means from a saturated second solution having a second solute in a second chamber; subjecting the first solution to "natural" or forward osmosis by means of the first solvent transfer means, in opposition to the second solution such that a net osmotic flow of the solvent takes place across the first solvent transfer means and into the second solution thereby increasing the volume of the second solution; drawing the second solution from the second chamber into a cooling means to cool the second solution; drawing the second solution into a third chamber that is divided by a second solvent transfer means from a third solution having a third solute in a fourth chamber; subjecting the second solution to forward osmosis by means of the second solvent transfer means, in opposition to the third solution such that a net osmotic flow of solvent takes place across the second solvent transfer means and into the third solution thereby increasing the volume of the third solution; drawing the third solution from the fourth chamber into a second heating means to heat the third solution; drawing the third solution into a fifth chamber to provide for removal of any remaining third solute; and collecting the third solution, now diluted, for use. Optionally, the fifth chamber can be divided by a third solvent transfer means from a fourth solution having a fourth solute in a sixth chamber. Prior to collecting the third solution, it would be subjected to forward osmosis by means of the third solvent transfer means, in opposition to the fourth solution such that a net osmotic flow of the solvent takes place across the third solvent transfer means and into the fourth solution, increasing its volume and diluting it. The fourth solution would then be collected, now diluted, for use.

In this invention the flow of $H_2O$ from one opposing solution to another is such that there is a net osmotic flow of $H_2O$ from a saline solution, such as seawater, through a series of intermediate solutions to an ending solution. The intermediate solutions, which are subjected to thermal and osmolar manipulation, are used to generate a final solution with a very low concentration of an acceptable or desirable end-product solute. The process takes advantage of the solutes having highly temperature dependent solubilities, such as $KNO_{3(s)}$ and $SO_{2(g)}$, as well as the relatively temperature indifferent solubility of $NaCl_{(aq)}$, the primary solute present in seawater.

In general, the first solution is a saline solution and the second and third solutions are aqueous solutions of salts (i.e., water is the solvent and the salt is the solute) having temperature dependent solubility. The solubility of the second solute is directly related to temperature while the solubility of the third solute is inversely related to the temperature. A fourth, optional solution contains one or more desired additives that will be introduced into the final product. Typically the first solution is seawater ($NaCl_{(aq)}$, the second solution is a saturated $KNO_3$ solution, the third solution is a saturated $SO_2$ solution at 15 atm partial pressure to insure sufficient concentration of the $SO_2$ solute, and the fourth solution is selected from the group of fertilizers such as $NH_4NO_3$, vitamins, minerals, NaF, chlorine or other water treatment additives.

To accomplish the goal of desalinization, a first solution (e.g. seawater) is drawn into a first heat exchanger, for example a steam condenser, where it is heated after which it is drawn into a first chamber. The first solution will typically have a temperature within the range of 20 to 80° C., more typically about 50° C., and will be heated to a temperature within the range of about 60 to 100° C., more typically about 100° C. It should be noted that the seawater drawn into the first heat exchanger can also be pre-heated to a desired temperature by first passing through a second heat exchanger where it removes heat from the $KNO_3$ solution entering the second chamber. The pre-heated seawater would then enter the first heat exchanger. The first chamber is divided by a semi-permeable membrane from a saturated second solution of a soluble salt whose solubility increases with an increase in temperature and vice versa. Due to the higher relative concentration of solutes in the second solution a net osmotic flow of $H_2O$ takes place across the membrane from the first solution into the second solution. This second solution is then drawn into a heat exchanger where it is allowed to cool while transferring its heat to the incoming seawater, such that the salt precipitates out until the solution is maximally saturated at the lower temperature. The second solution is typically cooled to a temperature within the range of 20 to 40° C., more typically about 30° C. The heat "lost" in this step may in fact be transferred to incoming seawater so as to be used more efficiently, as noted above. Thereafter the saturated second solution is drawn into a second chamber divided by another semi-permeable membrane from a third solution, under pressure, saturated with a solute whose solubility increases with a decrease in temperature. Due to the relatively greater saturation of the third solution as compared to the second solution, a net osmotic flow of $H_2O$ takes place across the second semi-permeable membrane from the second solution into the third solution. Thereafter the third solution is drawn into another heat exchanger where the solution is heated to a temperature within the range of 60 to 100° C., more typically about 100° C., accompanied by a corresponding decrease in the concentration of the solute. After being heated, the third solution is (with slight modification) the final product, or is drawn into another chamber divided by another semi-permeable membrane and opposed against a fourth solution of a desirable end product solute, which solute is added to generate the final product. A net osmotic flow of $H_2O$ takes place across the membrane towards the fourth solution, resulting in a treated fourth solution that is then ready for use as potable or agricultural water, as dictated by the nature of the end product solute.

In one embodiment of this invention, assistive pressure is introduced in the fourth or final stage such that the "forward" osmotic nature of the reaction is retained while the required surface area of the semi-permeable membranes used can be reduced. Alternatively, this assistive pressure can be used to increase the system rate of flow. It may also be desirable to introduce assistive pressure to the process as a whole or at various other steps. As indicated, this use of positive pressure aids in the forward osmosis contemplated by the invention.

In another embodiment of the invention, the processes described above are modified to allow the generation of energy. This energy is used to offset any needed energy expenditures needed to heat a given solution or pressurize a gas. For example, as the volumes of solutions increase due to net osmotic flow, the solutions may be allowed to rise, by means of their high osmotic pressure differentials, to a height sufficient to allow the generation of electricity should the solutions be then allowed to flow through hydroelectric turbines designed for this purpose. The power generated in this way is then used to sustain the operation of a compressor and/or pump for the gaseous solute of the third solution, for example, for $SO_2(g)$.

This invention is designed primarily for use in a co-generation environment, using as its primary energy source the low pressure "waste" steam which has been used to turn steam-driven electric generators. Typically, this energy would be used to raise the temperature of a given solution to a desired level. Other energy sources are feasible for this use, including solar, wind, geothermal, and conventional means.

The end product of potable water is available, regardless of rainfall patterns and without reducing supplies of other users or supplies needed to protect aquatic ecosystems. Desalinization used in combination with traditional water projects allows more efficient use of low cost storage based systems, and can even be used to recharge aquifers. With a reliable reserve of potable water, water resources from traditional sources can be more fully utilized without fear of drought shortages, while minimizing losses to evaporation and spillage. This maximum use of low cost water results in financial benefits that can offset the typically high cost of desalination facility construction.

Crystalline precipitates of the saturated solutions disclosed by this invention are kept suspended in their respective solutions to allow ordered deposit of solid, and to maintain saturation. In the first stage of the process, crystalline NaCl would be removed periodically, as necessary. This by-product may be sold commercially or put to other desirable use. Other precipitates occurring as a result of osmolar or pressure manipulations are themselves removed or recycled into the system as necessary or desirable.

An object of the invention is to provide an improved and more economically, environmentally, and energetically efficient process for desalinization of seawater.

DESCRIPTION OF THE PREFERRED EMBODIMENTS

Figure 1:
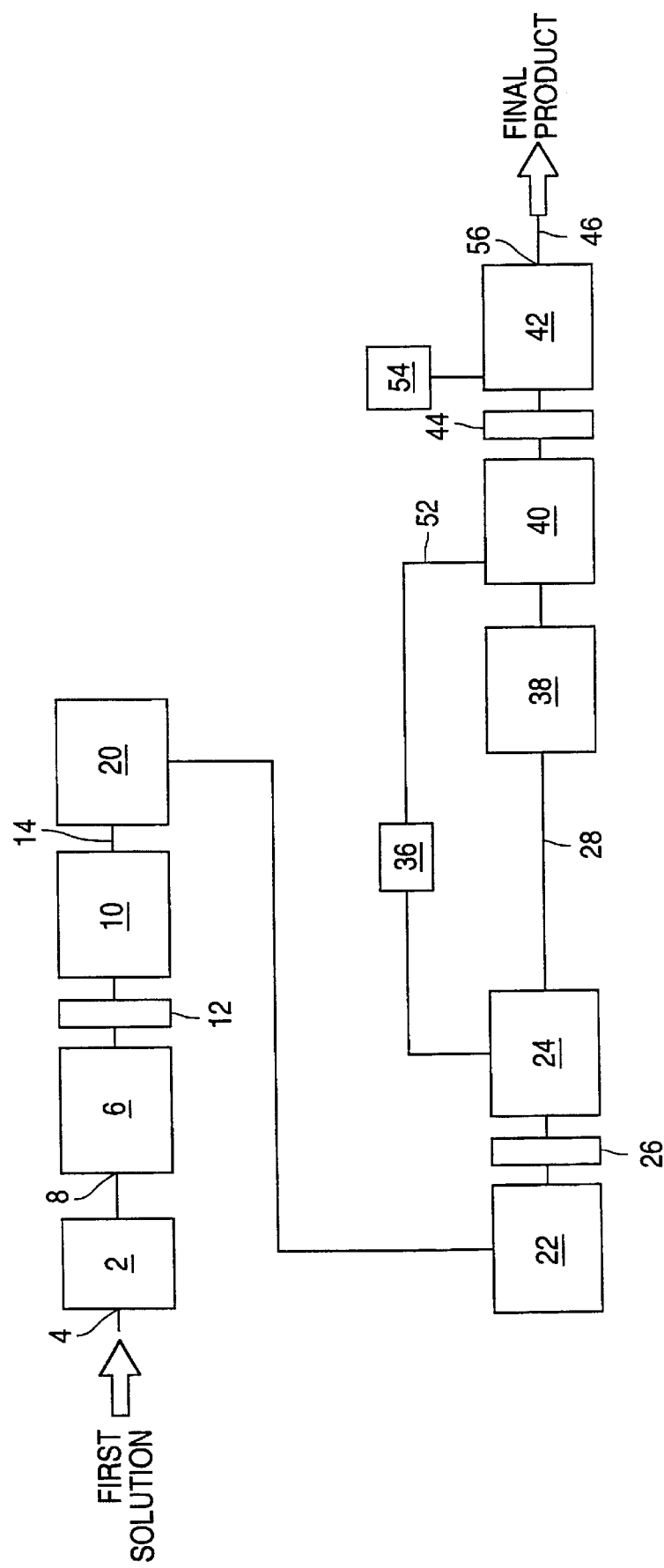
FIGS. 1 and 2 are schematic representations of different embodiments of the process of the invention.

Natural water supplies, whether considered "fresh" or "saline," contain dissolved salts, which dissociate in water. The presence of these minerals creates an aqueous solution in which the dissolved particles are called ions. The common ions that are encountered in most waters include the positively charged cations: calcium, magnesium, and sodium. The negatively charged anions include fluoride, sulfate, chloride, bromide, and silica.

Through a series of steps, involving the opposition of aqueous solutions (of differing osmolar concentrations and at various temperatures) across semi-permeable membranes, nearly 4.5 units of desalinized potable water can be produced for every unit of low-pressure steam available as an energy source. See Table I. The process takes advantage of the highly temperature dependent solubility's of solutes such as solid $KNO_3$ ("$KNO_{3(s)}$") and $SO_{2(g)}$, as well as the relatively temperature indifferent solubility of $NaCl_{(aq)}$, the primary solute present in seawater. The process uses an energy source readily available at any power production plant: the low pressure "waste" steam, which has been used to turn steam-driven electric generators. This energy source is commonly available, and after initial installation of the desalinization plant, it should represent a negligible cost.

Desalinization is an ion separation process used to reduce the dissolved salt content of saline solutions to a usable or "potable" level. All desalinization processes involve three liquid streams: the saline feedwater (e.g. brackish water or seawater), low-salinity product water, and a very saline concentrate (e.g. brine or reject water) streams. Reject waters may be discarded into aquifers or diluted with effluent and sprayed over golf courses or other public areas. Sufficiently low saline product water can be used for domestic, agricultural, or industrial uses. The system described herein is designed with the expectation that little or no brine discharge is produced.

In the methods of the invention, the first, second, and third solutions are subject to thermal and osmolar manipulation in order to generate a final solution with a very low concentration of an acceptable or desirable end-product solute. For example, in one preferred embodiment of this process the product is not pure water, but a solution containing a low concentration of some desirable end product solute, as dictated by the needs of the consumer. Typical examples of such additive solutes include, by way of illustration and not limitation, fertilizers such as ammonium nitrate ($NH_4NO_3$), a common agricultural fertilizer, vitamins, minerals, fluoride and sodium fluoride (NaF) in particular, which is a common "anti-cavity" water additive, acidity stabilizers, chlorine, other standard water treatment additives, and so forth, The solutes present in the end product of the method disclosed herein may allow the user of the invention to command a premium for the use of the solution so created from end users, as the presence in the water of these solutes is beneficial and they are typically introduced by conventional means.

The invention relates to an osmotic method for the extraction of a solvent from a first solution, having a first solute difficult to separate from the solvent, by passing said solvent through a series of intermediate solutions comprising the steps of drawing the first solution into a first heating means to heat the first solution; drawing the first solution into a first chamber that is divided by a first solvent transfer means from a saturated second solution having a second solute in a second chamber; subjecting the first solution to forward osmosis by means of the first solvent transfer means, in opposition to the second solution such that a net osmotic flow of the solvent takes place across the first solvent transfer means and into the second solution thereby increasing the volume of the second solution; drawing the second solution from the second chamber into a cooling means to cool the second solution; drawing the second solution into a third chamber that is divided by a second solvent transfer means from a third solution having a third solute in a fourth chamber; subjecting the second solution to forward osmosis by means of the second solvent transfer means, in opposition to the third solution such that a net osmotic flow of solvent takes place across the second solvent transfer means and into the third solution thereby increasing the volume of the third solution; drawing the third solution from the fourth chamber into a second heating means to heat the third solution; drawing the third solution into a fifth chamber to provide for removal of any remaining third solute; and collecting the third solution, now diluted, for use.

The method may also include the use of one or more means for stirring or otherwise agitating the solutions so as to enhance osmotic flow. In any solvent exchange across a solvent transfer means such as a semi-permeable membrane, a thin solvent barrier forms on the surface of the membrane, and slows the rate at which that solvent passes through. The thickness of the barrier can be reduced, and the rate of the process increased, if the solution is well stirred throughout the process. Stirring was not included in description of the preferred process because it is not essential and uses energy. However, the invention does contemplate the optional introduction of stirring in order to increase the process rate.

Optionally, the fifth chamber can be divided by a third semi-permeable membrane from a fourth solution having a fourth solute in a sixth chamber. The third solution, prior to the collection step, would then be subjected to forward osmosis by means of the third semi-permeable membrane, in opposition to the fourth solution such that a net osmotic flow of the solvent takes place across the third semi-permeable membrane and into the fourth solution, increasing its volume and diluting it. The fourth solution would then be collected, now diluted, for use in commerce, industry or agriculture, for example.

The method of the invention also may involve the steps of drawing the fourth solution into a chamber divided by a fourth semi-permeable membrane and subjecting the fourth solution to assisted forward osmosis through the application of pressure such that there is a net flow of solvent from the fourth solution across the fourth semi-permeable membrane, thereby extracting any solutes that would hinder the productive use or consumption of said solvent. The addition of pressure serves to both facilitate forward movement of the solvent and to minimize the size (surface area) requirements for the fourth semi-permeable membrane.

If difficulties arise in reducing the solute concentration in any of the stages of the process, additional steps may be introduced. If any problems occurred in the third phase, for example, a fourth step could be introduced, involving the alternation of other temperature dependent solutes ($K_2Cr_2O_7$ followed by $Ce_2(SO_4)_3$ or $CO_2$, for example) to further reduce overall concentration of solutes until an appropriate concentration is obtained.

As noted above, the invention has several chambers holding the various solutions used in the invention. Each chamber can be a single discrete vessel, or two adjacent vessels can be housed within a single vessel, the chambers being separated from each other by a solvent transfer means, also housed within the vessel. In this manner, a single vessel can hold two different solutions which are separated by a solvent transfer means.

FIG. 1 illustrates a schematic flow-chart of one embodiment of the process of the invention. A first solution, the solution being treated, e.g., seawater, flows into a heating means (2) at inlet (4) and is raised in temperature. In this embodiment of the invention, the various chambers are described as separate discrete vessels, separated by solvent transfer means, shown for purposes of illustration only, as semi-permeable membranes, which is an alternate embodiment to having a single vessel divided into two chambers by a solvent transfer means.

After being heated, the first solution then flows into a first chamber (6) through inlet (8), where it is opposed against a second solution in a second chamber (10), which is at the same temperature, by a first semi-permeable membrane (12). A net osmotic flow of $H_2O$ takes place across membrane (12) (towards the second solution), which raises the level of the second solution in chamber (10) until the excess solution flows out a conduit (14) into cooling means (20) and is allowed to cool. Crystalline solute precipitates are kept suspended in their respective solutions, the first and second solutions to allow ordered deposit of solid and to maintain saturation.

The second solution then flows into a third chamber (22), where it is opposed against a third solution in a fourth chamber (24), which is at the same temperature, by a second semi-permeable membrane (26). A net osmotic flow of $H_2O$ takes place across membrane (26), towards the third solution and raises the level of the solution in the chamber (24) until the excess solution flows out a second conduit (28) into heating means (38) and is raised in temperature. Crystalline solute precipitate in the second solution are kept suspended as before, to allow ordered deposit of solid and to maintain saturation. A compressor (36) operates to maintain the pressure of the gaseous solute in the third solution in chamber (24).

The third solution then flows into a fifth chamber (40), where it is opposed against a fourth solution in a sixth chamber (42), also at the same temperature, by a third semi-permeable membrane (44). A net osmotic flow of $H_2O$ takes place across membrane (44) towards the fourth solution, raising the level of the solution in the chamber (42). The fourth solution is then allowed to flow out of chamber (42) through a third conduit (46) and exits through a solution outlet (56) as the final product, for example, as potable or relatively pure water. The gaseous solute in the third solution is removed via a conduit (52) to the compressor (36). The fourth solute is added to the fourth solution in chamber (42), as needed, from solute holder (54).

Figure 2:
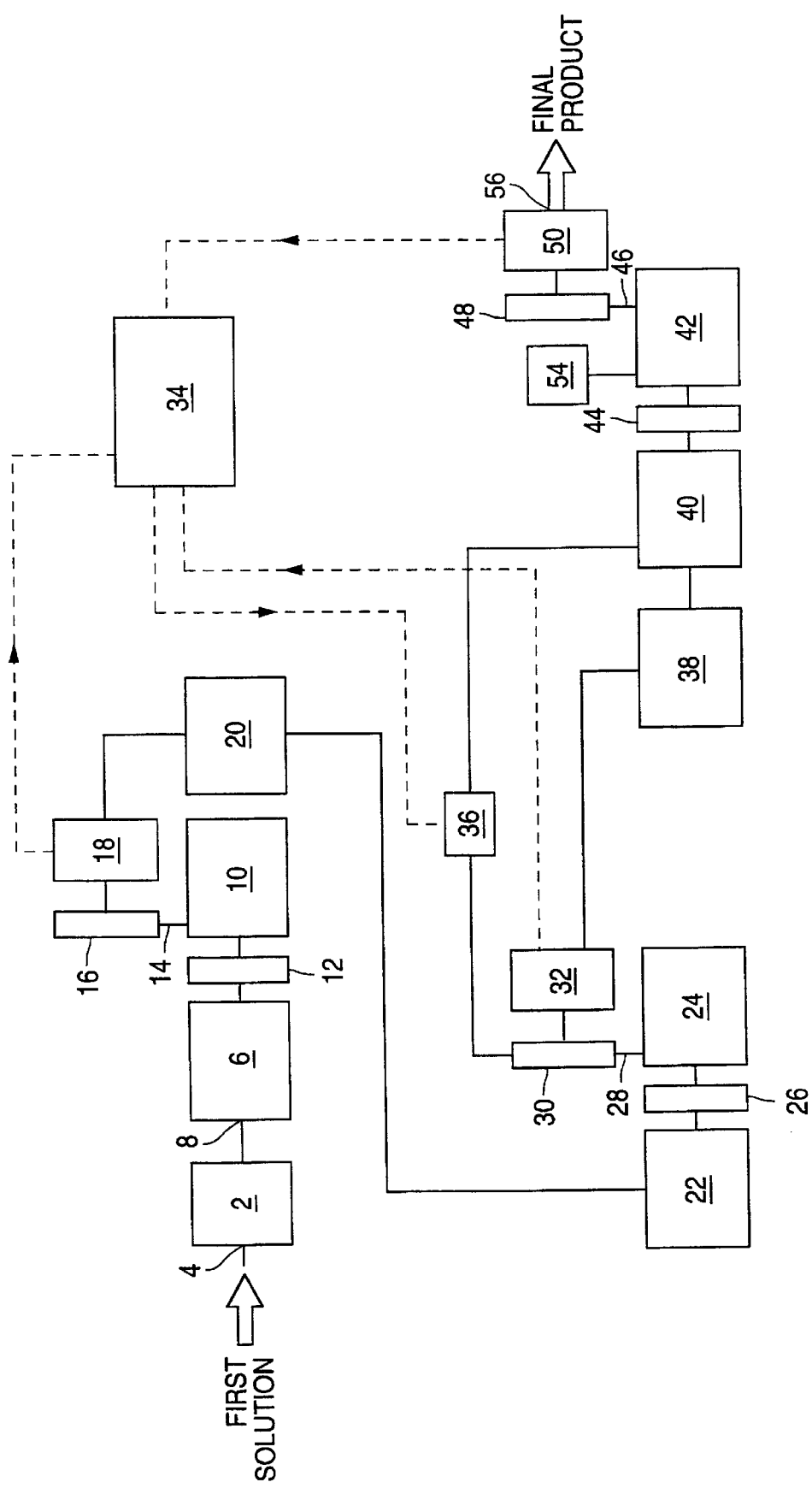

FIG. 2 illustrates another embodiment of the invention where one or more solutions exiting their respective receptacles, utilize the osmotic head present in order to generate electricity, the flow of which is shown by the dashed lines (solid lines indicated fluid flow). In FIG. 2, the second solution exits a first receptacle (16) and thereafter moves through an energy generator (18), generating electricity, such as by driving a hydroelectric turbine. The potential energy is then captured for use. This is an optimal location for such a generator since the osmotic head in chamber (10) is the highest of the entire process, reaching as high as 124 atm. However, other energy generators can be positioned in the system. For example, the third solution can exit chamber (24), move into a second receptacle (30) and thereafter move through a second energy generator (32). Similarly, the fourth solution can exit chamber (42), move into a third receptacle (48) and thereafter move through a third energy generator (50). Although there are three generators illustrated in FIG. 2, this is not intended to be limiting in any manner, as there may be a single generator, preferably generator (18) located off chamber (10), or additional generators included at other steps in the process. The energy generated from the one or more generators may be stored for later use in energy storage device (34). Energy produced in this manner has countless uses either within or outside of the desalinization plant. For example, the compressor (36), can be powered by such generated electricity.

As noted above, the method of the invention also may involve subjecting the fourth solution to assisted forward osmosis. Alternately, if a fourth solution is not utilized, the third solution may be subjected to assisted forward osmosis. In either case, the energy requirements for the assisted forward osmotic step can be partially met by energy produced in the forward osmotic processes shown in FIG. 2.

The first solution in the aforementioned processes is an aqueous solution that is being treated, either for the purpose of potable water recovery or for the removal of undesired solutes, which include undesired chemically precipitable soluble salts such as NaCl. Typical examples include aqueous solutions such as seawater, brine and other saline solutions, brackish water, mineralized water, industrial waste water, and so forth. Although the first solution, and the second, third and fourth solutions described below are preferably aqueous solutions, use of non-aqueous solutions (organic solvents such as alcohols and so forth) in the methods of the invention are also contemplated.

The second solution is a solution of a soluble salt that is temperature precipitable in that it can be precipitated by a decrease in solution temperature, and includes by way of illustration and not limitation, a saturated $KNO_3$ solution, a saturated $Na_3PO_4$ solution, a saturated sucrose solution, and so forth. The preferred solute in the second solution is $KNO_3$.

The third solution is a saturated solution of a volatile salt at a suitable partial pressure to insure entrance of the salt, in its gaseous state, into an aqueous phase, and includes by way of illustration and not limitation, a saturated $SO_2$ solution, a saturated $Ce(SO_4)_3$ solution, a saturated $CO_2$ solution, and so forth. The solubility of these solutes is also temperature dependent. However, the solubility of the third solute decreases with an increase in the temperature of the third solution.

The preferred solute in the third solution is $SO_2$, with the solution being at 15 atm partial pressure to insure sufficient concentration of $SO_2$. All gas pressures are listed as partial pressures, and do not describe the total pressure present above the solutions. The $SO_{2(g)}$ (or other volatile third solute) will in most cases be mixed with some inert gas, resulting in an overall pressure several times higher than that listed. Any proportion of volatile (inversely proportional temperature dependent solubility) solutes and inert gases may be used in the gas mixture above the solutions, as is appropriate to maintain desired osmolar concentrations and system operating pressures.

The fourth solution is a saturated additive solution, and includes by way of illustration and not limitation, a saturated solution containing fertilizers such as $NH_4NO_3$, vitamins, minerals, NaF, chlorine, water treatment additives, and so forth. The preferred solute in the fourth solution is $NH_4NO_3$ or NaF, more preferably $NH_4NO_3$.

Each successive solution has a higher salt solute concentration than the preceding solution so that water diffuses to the subsequent solution by forward osmosis and passes through the solvent transfer means, for example a semi-permeable membrane, without the addition of pressure. For example, the concentration of the temperature precipitable salt solute in the second solution is greater than the salt concentration in the first solution. Similarly, the concentration of the volatile solute in the third solution is greater than the temperature precipitable salt solute concentration in the second solution.

The various methods described herein may be conducted continuously, or in batches, to better isolate the solutions throughout the process.

In general, any highly temperature dependent solutes may be used in the process, as long as the thermal manipulations of their solubilities, along with alternation between directly and inversely proportional temperature dependent solubility solutes, as has been described, result in a lower overall osmolarity. For example, it is possible to conduct this process with sucrose as the solute in the second solution, and carbon dioxide in the third solution. Although the $CO_{2(g)}$ would have to be present at a much higher partial pressure above its solution than would $SO_{2(g)}$. This will typically involve the alternation between solutes whose solubilities are directly proportional to the temperature of the solution with solutes for which the inverse relationship is true. By alternating between the two types, in a process involving several steps, the overall concentration of solutes is reduced. Any replacement solute may be used in final stage, (rather than $NH_4NO_{3(s)}$) as long as its presence in the final product would be favored. If the end water product were intended for potable use, sodium fluoride, a commonly introduced solute in drinking water, could be used instead as the fourth solution. The needs of the end product consumer are the primary determinants of the end product solutes.

The solutions are described above as being either heated or cooled by heating or cooling means, which are preferably heat exchangers. The temperatures of the solutions are designed to give an optimum rate of desalinized water production, assuming an abundant source of waste heat. The actual temperature of the solutions could be considerably lower, depending on the concentration of solutes in the seawater, the solutes used in the process, the partial pressures of any gas used, and the concentration of the end product solutes. Solutions are typically heated to a temperature within the range of about 60 to 100° C., more typically about 100° C. Solutions are typically cooled to a temperature within the range of about 20 to 40° C., more typically about 30° C.

Any materials may be used to construct the various holding and/or storage means (chamber, vessels and receptacles), conduits, piping, and related equipment, as long as they will withstand the weight of the solutions, and be unreactive with any solutes present. Typical materials are non-corrosive, non-reactive materials such as stainless steel, polyvinyl chloride, fiberglass, various plastics, and so forth. The chambers or vessels can take any suitable configuration, but are typically cylindrical tanks, wound membrane tubing, piping, and so forth. The receptacles are typically water towers, cylindrical tanks, vessels, and so forth.

As discussed above, it is important to note that the chambers are shown as separate vessels but the invention is not limited to that configuration, i.e., two different solutions can be contained within a single vessel that is partitioned into two chambers separated by a solvent transfer means.

The size and configuration of the holding means are not critical to the invention. Typical sizes will range from 5 to 500 gallons in capacity. The main consideration is that the holding means are large enough to handle the flow rate of the first solution, which may range from about 5 to 100 gallons/minute. If size constraints are a concern, the inflow rate can be adjusted to accommodate such constraints. Similarly, if the inflow rate is non-adjustable, the size of the holding means can be adjusted accordingly. Typically the process of the invention will produce about 4.5 units of desalinized water for every unit of low pressure steam available as an energy source. Scale-up can be based upon these parameters.

The heating and cooling means can be electrical heaters, refrigeration units, heat exchangers such as steam condensers, and so forth, such as are well known in the art, but are preferably heat exchangers. The heating and cooling means, along with any other equipment used in the process of the invention that may have power requirements, can derive their energy from any of a variety of commonly used sources, including by means of illustration and not limitation, waste steam, solar energy, wind or geothermal energy, and conventional means.

There are many types of solvent transfer means which can be used to separate various solutions, and provide for the end production of potable water, the main consideration being that they allows the passage of water (solvent) and exclude (and do not react with) the solutes in use. Preferably, at least one of the solvent transfer mean is a semi-permeable membrane. The membrane can have variety of configurations including, thin-films, hollow fiber membranes with thin walls or fabric-like configurations consisting of a hollow fibers and monofilaments, and so forth. There are numerous commercially available semi-permeable membranes characterized by having small pores so that water molecules may pass freely, while solute molecules (such as NaCl, $KNO_3$, $SO_2$, $Ce(SO_4)_3$ and $NH_4NO_2$) or ionic molecular species (such as chloride, sodium, calcium, bromide, and magnesium) do not pass through (or at least their passage is significantly hindered), i.e., water is allowed to pass through the membrane into the next solution while the solute remains. Such semi-permeable membranes can be organic membranes made of materials such as cellulose acetate, cellulose nitrate, polysulfone, polyvinylidene fluoride, polyamide and acrylonitrile co-polymers; mineral membranes or ceramic membranes made of materials such as $ZrO_2$ and $TiO_2$; and so forth. It is important to note that the membranes used in the methods of the invention need not be made out of one of these materials, they can be composites of various materials already mentioned and designed for a specific application using a specific series of solutes.

It is also important to note that different steps in the process can use membranes that are constructed out of different materials so as to optimize the process. For example, ceramic membranes may be particularly useful in the stages involving $SO_2$, as these solutions will be highly acidic, and ceramic membranes are very resistant to solutions of his type, therefore requiring less maintenance and consequent overhead cost.

It is important to note however, that the use of membranes for solution separation may not be needed in all cases. The solvent transfer means can be any means by which a transfer may be effected of the solvent between solutions of differing concentrations. One example of such an alternate method is that of a "falling film" evaporation transfer technique, which has been used successfully in the transfer of solvent from one solution to another. One advantage of such a substitution would be that the buildup of solute precipitation upon the membranes would be eliminated, as membranes would no longer be involved.

The energy generators are preferably hydroelectric turbines, and are more preferably designed specifically for use in this process by the turbine provider or manufacturer. However, any energy generator such as is well known in the art, can be utilized in the invention.

Suitable energy storage devices include, by way of illustration and not limitation, batteries of various design, flywheels or other mechanical energy storage devices.

Suitable compressors are those such as are well known in the art.

The first solution may optionally be filtered prior to undergoing the desalinization process of the invention, to remove debris and particulate matter, for example.

In a preferred osmotic process of the invention, a solvent is extracted from a first solution that contains a first solute that is difficult to separate from the solvent by passing the solvent through a series of intermediate solutions. The first solution is drawn into a first heat exchanger where the first solution is heated, preferably to within the range of about 60 to 100° C., more preferably to about 100° C. After being heated, the first solution is then drawn into a first chamber that is divided by a first semi-permeable membrane from a saturated second solution having a second solute. The solubility of the second solute is directly proportional to the temperature of the second solution, i.e., its solubility decreases when the second solution is cooled in the next step.

The first solution is subjected to forward osmosis by the first semi-permeable membrane, in opposition to the second solution such that a net osmotic flow of said solvent takes place across said first semi-permeable membrane and into the second solution increasing its volume. The second solution is drawn into a second heat exchanger where it is allowed to cool, preferably to within the range of about 20 to 40° C., more preferably to about 30° C. After being cooled, the second solution is drawn into a second chamber that is divided by a second semi-permeable membrane from a third solution having a third solute. The solubility of the third solute is inversely proportional to the temperature of the third solution, i.e., its solubility decreases when the third solution is heated in the next step.

The second solution is subjected to forward osmosis by the second semi-permeable membrane, in opposition to the third solution such that a net osmotic flow of solvent takes place across the second semi-permeable membrane and into the third solution, increasing its volume. The third solution is drawn into a third heat exchanger, where the third solution is heated, preferably to within the range of about 60 to 100° C., more preferably to about 100° C. After being heated, the third solution is drawn into a third chamber to provide for removal of any remaining third solute. The third solution, now diluted and ready for use, is collected. Optionally, the third chamber can be divided by a third semi-permeable membrane from a fourth solution having a fourth solute. The third solution, prior to the collection step, would then be subjected to forward osmosis by means of the third semi-permeable membrane, in opposition to the fourth solution such that a net osmotic flow of the solvent takes place across the third semi-permeable membrane and into the fourth solution, increasing its volume and diluting it, The fourth solution would then be collected, now diluted, for use.

Figure 3:
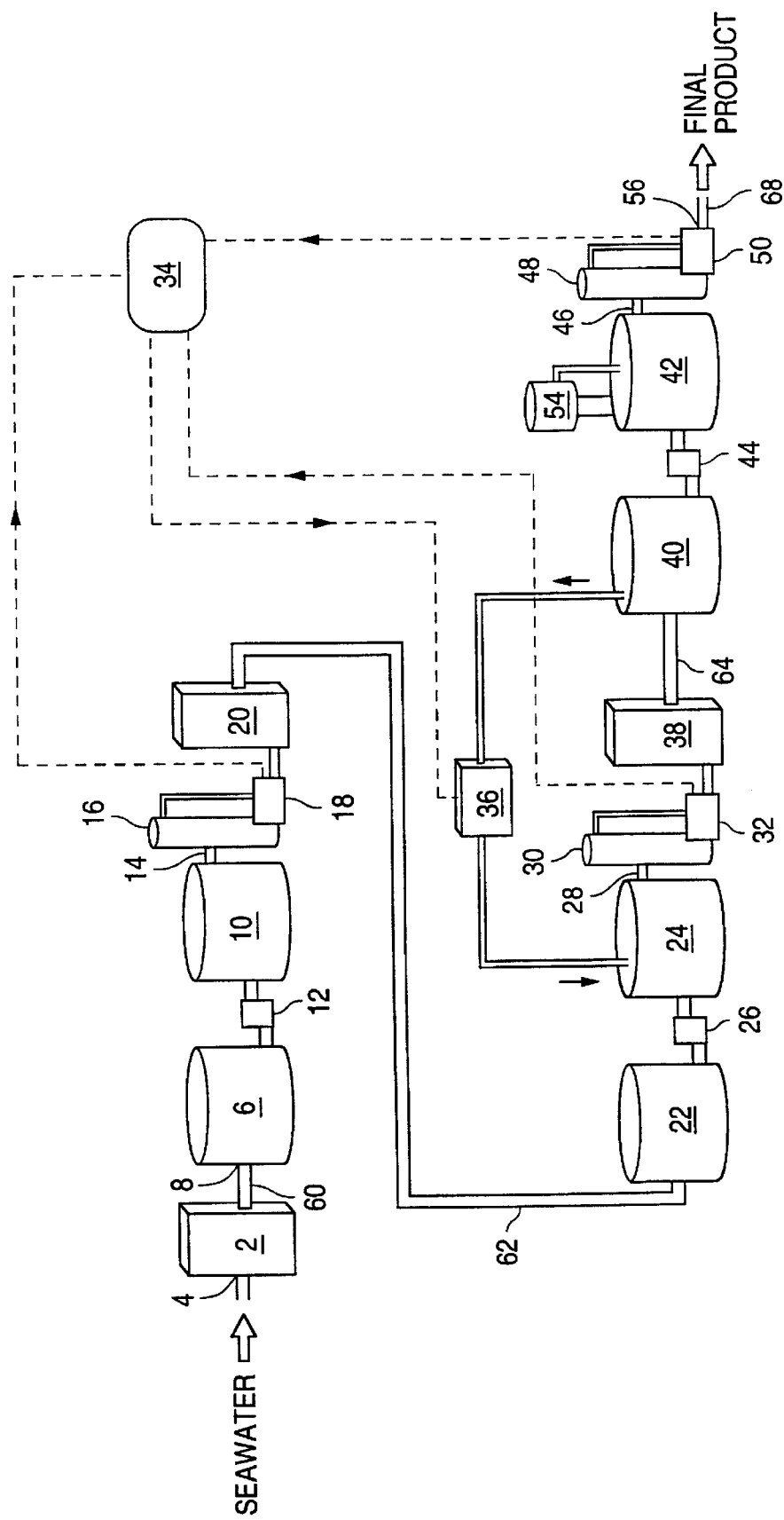
FIG. 3 shows a schematic illustrating the apparatus and stepwise practice for processing a feed liquid, particularly for desalinating saline solutions, in accordance with the present invention.

This preferred embodiment of the invention is illustrated in FIG. 3 and Table I present some useful operating parameters.

TABLE 1

Solution Concentration Calculations

Solubility of NaCl at 100° C. = 39.2 g/100 g (water)

| | |
|---|---|
| 39.2 g NaCl × (mol NaCl/58.4428 g) = 0.6707 moles NaCl | (100 g water + 39.2 g NaCl) × (mL/1.167 g) × (L/1000 mL) = 0.119 L solution |
| 0.6707 mol NaCl × (1.6 osmoles/mol) = 1.073 osmoles | 1.073 osmoles/0.119 L = 9.017 osmole/L saturated NaCl solution |

Solubility of $KNO_3$ at 100° C. = 245 g/100 g (water)

| | |
|---|---|
| 245 g $KNO_3$ × (mol $KNO_3$/101.105 g) = 2.423 moles $KNO_3$ | (100 g water + 245 g $KNO_3$) × (mL/1.568 g) × (L/1000 mL) = 0.220 L solution |
| 2.423 mol $KNO_3$ × (1.2 osmoles/mol) = 2.9076 osmoles | 2.9076 osmoles/0.220 L = 13.216 osmole/L saturated $KNO_3$ solution |

Solubility of $KNO_3$ at 30° C. = 45.3 g/100 g (water)

| | |
|---|---|
| 45.3 $KNO_3$ × (mol $KNO_3$/101.105 g) = 0.448 moles $KNO_3$ | (100 g water + 45.3 g $KNO_3$) × (mL/1.216 g) × (L/1000 mL) = 0.120 L solution |
| 0.448 mol $KNO_3$ × (1.8 osmoles/mol) = 0.8064 osmoles | 0.8064 osmoles/0.120 L = 6.72 osmole/L saturated $KNO_3$ solution |

Solubility of $SO_2$ at 30° C. (1 atm) = 7.80 g/100 g (water) [At 15 atm, 15, 15 × 7.8 g = 117 g $SO_2$/100 g $H_2O$]

| | |
|---|---|
| 7.80 g $SO_2$ × (mol $SO_2$/64.06 g) × 15 (atm) = 1.826 moles $SO_2$ | (100 g water + 117 g $SO_2$) × (approximately 1 mL/1.3 g) × (L/1000 mL) = 0.1669 L |
| 1.826 mol $SO_2$ × (1 osmoles/mol)* = 1.826 osmoles | 1.8264 osmoles/0.1669 L = 10.943 osmole/L saturated $SO_2$ solution |

Solubility of $SO_2$ at 100° C. (1 atm) = 1.09 g/100 g (water) [At 0.20 atm, 0.20 × 1.09 g = 0.218 g $SO_2$/100 g $H_2O$]

| | |
|---|---|
| 1.09 g $SO_2$ × (mol $SO_2$/64.06 g) × 0.20 (atm) = 0.003403 moles $SO_2$ | (100 g water + 0.003 g $SO_2$) × (approximately 1 mL/1 g) × (L/1000 mL) = 0.100003 L |

TABLE 1-continued

Solution Concentration Calculations

| | |
|---|---|
| 0.003403 mol $SO_2$ × (1 osmoles/mol) = 0.003403 osmoles | 0.0034 osmoles/0.100003 L = 0.034 osmoles/L saturated $SO_2$ solution |

Necessary concentration of $NH_4NO_3$

| | |
|---|---|
| 0.05 (osmole/L) × (1 mol/1.8 osmoles) = 0.028 moles/L | [0.028 moles = 504.2 ppm solute concentration (approximately)] |

Referring now to FIG. 3, seawater flows into a heat exchanger (2), for example a steam condenser, at inlet (4) and is raised in temperature to approximately 100° C. The seawater then flows into seawater tank (6) through inlet (8), where it is opposed against a saturated solution of $KNO_{3(aq)}$ in vessel (10), which is also at 100° C., by semi-permeable membrane (12). A net osmotic flow of $H_2O$ takes place across membrane (12) (towards the $KNO_{3(aq)}$ solution), which raises the level of the solution in the $KNO_{3(aq)}$ tank (10) until the excess solution flows out conduit (14), for example an overflow pipe, into a water tower (16) and thereafter through a hydroelectric turbine (18), generating electricity. A crystalline NaCl(s) precipitate and a $KNO_{3(s)}$ precipitate are kept suspended in their respective solutions to allow ordered deposit of solid and to maintain saturation.

Saturated $KNO_{3(aq)}$ then flows into heat exchanger (20) and is allowed to cool to approximately 30° C. The saturated $KNO_{3(aq)}$ solution then flows into $KNO_{3(aq)}$ tank (22), where it is opposed against a saturated solution of $SO_{2(aq)}$ in tank (24), (15 atm partial pressure, approximately 220.5 psi), which is also at 30° C., by a semi-permeable membrane (26). All pressures of $SO_2$ refer to partial pressures above the solution, such that the total ambient pressure may be considerably higher, yet never below 1 atmosphere. A net osmotic flow of $H_2O$ takes place across membrane (26), (towards the $SO_{2(aq)}$ solution) and raises the level of the $S_{2(aq)}$ solution in tank (24) until the excess solution flows out pipe (28) into water tower (30) and thereafter through a hydroelectric turbine (32), generating electricity. The energy generated from generators (18), (32) and those noted below, may be stored for later use in energy storage device (34). Crystalline $KNO_{3(s)}$ is kept suspended as before, to allow ordered deposit of solid and to maintain saturation. A compressor (36), powered by electricity generated by the several generators, thereby maintaining the pressure of $SO_{2(g)}$.

Saturated $SO_{2(aq)}$ then flows into the heat exchanger (38) and is raised in temperature to approximately 100° C. It then flows into the $SO_{2(aq)}$ tank (40), (at 1 atm, approximately 0.2 atm partial pressure), where it is opposed against a solution of $NH_4NO_{3(aq)}$ in tank (42), also at 100° C., by semi-permeable membrane (44). A net osmotic flow of $H_2O$ takes place across membrane (44) towards the $NH_4NO_{3(aq)}$ solution, raising the level of the solution in the $NH_4NO_{3(aq)}$ tank (42). Any excess may be allowed to flow out of tank (42) through overflow pipe (46) into receptacle (48) and thereafter through a energy generator (50), generating electricity. $SO_{2(g)}$ is removed via a conduit to the compressor (36), and $NH_4NO_{3(s)}$ is added to the $NH_4NO_3$ tank (42), as needed, from solution holder (54). The aqueous product of the above process is allowed to be exited through a solution outlet (56).

Osmotic pressure, or the pressure generated by the net flow of solvent ($H_2O$) across a semi-permeable membrane, between two solutions of different concentrations, is a colligative property. This means that it depends not on the type of dissolved species, but only on their number. It is important to note that some substances dissolve in solution into more than one solute particle. This dissolved species concentration is denoted by the term "osmolar concentration." And the degree to which species dissolve is represented by a "Van Hoff Factor," established for a specified solvent, solute, temperature, and concentration. The factors used in the calculations below, and as applied to the process above, are based on those for dilute solutions at close to room temperatures, and therefore imprecise, but all attempts have been made to approximate in a way the works against the efficiency of the disclosed system. Therefore, the actual osmolar concentrations are expected to be greater than those calculated here.

Additionally, the concentration of a gas in solution is directly proportional to its partial pressure above the solution. In these calculations, 15 atmospheres was considered to have increased the concentration of a $SO_{2(aq)}$ by 15, according to Henry's Law. Calculations of this nature are very imprecise, both because of variances in the solubility of the gas and the tendency of reactive gasses like $SO_2$ to dissociate into other species. These calculations are considered adequate as a general guide since the pressure of the gas can easily be adjusted. In addition, the osmolar concentration is independent of the type of solute, whether it is $SO_{2(aq)}$ or some reactant product thereof. Densities were also important in these calculations, and in all but those of the $SO_2$ solutions, the data used is highly reliable. In the calculations involving $SO_2$ it was assumed that the density was approximately 1.3 g/mL, a conservative estimate for the number of grams dissolved. Under one atmosphere, the density was assumed to be the same as water. While these assumptions may not be entirely accurate, there are appropriate in that they decrease the efficiency of the system disclosed herein, in that higher densities lend to higher concentrations.

When discussing the generation of osmotic pressure the difference in osmolar concentrations in "stage 1" (portion of method immediately before, during and immediately after movement of solvent across membrane (12)) is:

$$13.216 \, (KNO_3) - 9.017 \, (NaCl) = 4.20 \text{ osmole/L}$$

Using the equation ($\pi$=MRT, where $\pi$ is osmotic pressure, the following can be determined. In stage 1, (4.20 osmole/L)(0.0821 L atm/k mol)(373 K)=128.618 atm. In "stage 2" (portion of method immediately before, during and immediately after movement of solvent across membrane (26)), [10.943 osmole/L ($SO_2$)–6.72 osmole/L ($KNO_3$)](0.0821 L atm/k mol)(313 K)=108.52 atm (−15atm pressure of $SO_2$ (gas) on the solution)=93.52 atm. In "stage 3" (portion of method immediately before, during and immediately after movement of solvent across membrane (44), [0.05 osmole/L ($NH_4NO_3$)–0.034 osmole/L ($SO_2$)](0.0821 L atm/k mol) (373 K)=0.5 atm. Throughout the entire process, 128.618 atm+93.52 atm+0.5 atm=222.638 atm of pressure which may potentially be generated. Additionally the dissolution of $NH_4NO_{3(s)}$ in stage 3 has a significant cooling effect on its resulting solution. If the semi-permeable membrane used is able to discriminate between water molecules of differing thermal energies, additional pressure may be generated through the thermostatic effect.

By setting equal two versions of the ideal gas constant (0.0821 L atm/K mol=3.14 J/K mol), it is possible to establish a relationship between atm pressure and the energy that this pressure theoretically represents: 38.246 J/L atm. Using this ratio, 222.638 atm (38.246 J/L atm)=8515.01 J/L or 8.515 KJ/L ($H_2O$). For each liter of water desalinated, 8.5 KJ of energy may theoretically be obtained. Alternatively for each mole, 153.4 J may be obtained (1 L=1000 mL=1000 g/[18.016 g/mol]=55.51 moles water; and 8515.01/55.51 moles=153.4 J/mol.).

The electricity generated in this process represents a partial reclamation of the energy contained in the low-pressure waste steam used to heat the solutions in stages 1 and 3 (153.4 J/Mol water 4.5 moles water/mol. steam=690.3 J reclaimed/mole waste steam used). This electricity, generated by the hydroelectric turbines involved in the process, should be sufficient to power the $SO_{2(g)}$ compressor between stages 2 and 3.

It is possible that there may be enough electricity produced to power a reverse osmotic step, should such an additional step by needed or desirable. This additional reverse osmotic purification step would require a small amount of piston pressure, approximately 12.2329 atm. This application of this pressure would of course need to be supplied from an energy source.

It is important to note that all quantitative data here is theoretical, and that the actual process will have somewhat different actual results, particularly in regards to the quantity of energy produced.

The energy required to raise the temperature of water is computed by use of its heat capacity, which is 75.4 Joules/ (mol ° C.). The actual heat capacities of saturated or nearly saturated aqueous solutions are, of course, different but the figures here give a good approximation. However, the above figures still provides an adequate approximation for the necessary calculations of the current invention, see Table I, above.

In order to raise the temperature of water from 50° C. to 100° C. (stage 1), the following amount of energy must be used: 50° C.×[75.4 J/(mol ° C.)]=3770 J/mol or 3.770 KJ/mol. The same calculations apply for exchanger (38) (stage 3), with a change in temperature from 30° C. to 100° C. are: 70° C.×[75.4 J/mol ° C.)]=5278 J/mol or 5.278 KJ/mol. The total energy requirement for the heating of one mole of solution through the desalinization process is then: 3.770 KJ/mol+5.278 KJ/mol=9.048 KJ/mol.

The energy provided by the condensation of steam is represented by the negative of the enthalpy of vaporization: −40.6 KJ/mol. Therefore, each mole of steam which condenses on pipes conducting solutions has the potential of heating to the required temperatures: 40.6 KJ/9.048 KJ=4.487 moles solution. For each unit of steam passed through a power plant's generating turbines, there exists the energy needed for the desalinization of nearly four and one-half units of seawater.

In an alternate embodiment of the invention disclosed herein, if the rate of the process is slowed sufficiently in stage 2, the temperature of stage 1 may be reduced to approximately 60° C., in which case the process becomes much more energy efficient.

Figure 4:
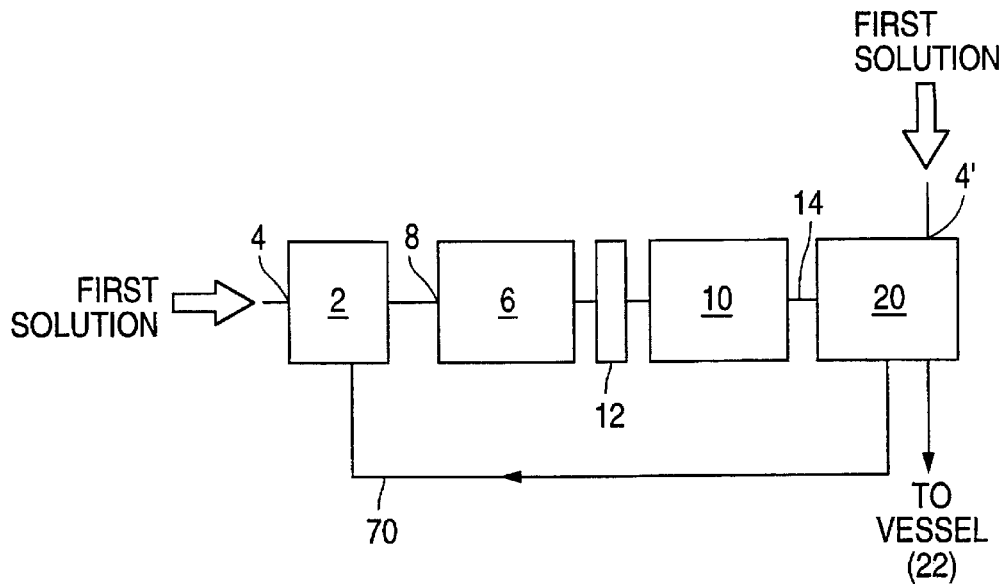
FIGS. 4, 5 and 6 illustrate modifications to the embodiments of FIGS. 1 and 2.

FIG. 4 illustrates an alternate embodiment of the invention illustrating another means of heating the first solution to the desired temperature by using heat exchanger (20). Heat exchanger (20) can be used instead of heat exchanger (2), but it is preferred to use exchanger (20) to supplement the heat provided by exchanger (2) rather than be the sole heat source. In this manner, the first solution, prior to flowing into heating means (2), can be heated to the desired temperature, such as 50° C., by first passing through the second heat exchanger (20), removing heat from the second solution. Since the second solution flowing into exchanger (20) is at an elevated temperature and is being cooled, some of the first solution can be directed to exchanger (20) through inlet (4') and be used to draw heat from the second solution, resulting in an increase in the temperature of the first solution. This warmed first solution is then directed to heat exchanger (2) by conduit (70) for further increasing of its temperature, or directly to vessel (6) if it is already at the desired temperature.

As noted above, the final product, with slight modification, can be used as produced from vessel (40), i.e., the additives presented in vessel (42) are optional. In the embodiment shown in FIG. 5, the solution exiting vessel (40) would be subjected to residual gas solute removal means (58). Typically the amount of gas solute still present in the solution exiting vessel (40) is small. However, it is still preferable to have it removed by means (58). For example, when the solute is $SO_2$, removal means (58) would be a lime bed or other acid removal system.

The invention also encompasses apparati for conducting the methods described herein. One embodiment of the invention pertains to an apparatus for the extraction of a solvent from a first solution, having a first solute difficult to separate from the solvent from a first solution comprising a means for feeding the first solution to a first heating means to heat said first solution to about 60 to 100° C.; a first conduit connecting the first heating means to a first chamber; a second chamber separated from the first chamber by a first semi-permeable membrane; a cooling means to cool a second solution to about 20 to 40° C., connected to the second chamber by a second conduit and connected to a third chamber by a third conduit; a fourth chamber separated from said third chamber by a second semi-permeable membrane; a second heating means to heat a third solution to about 60 to 100° C., connected to the fourth chamber by a fourth conduit and connected to a fifth chamber by a fifth conduit; a sixth conduit connected to the fifth chamber, by which a final product exists the apparatus.

Figure 5:
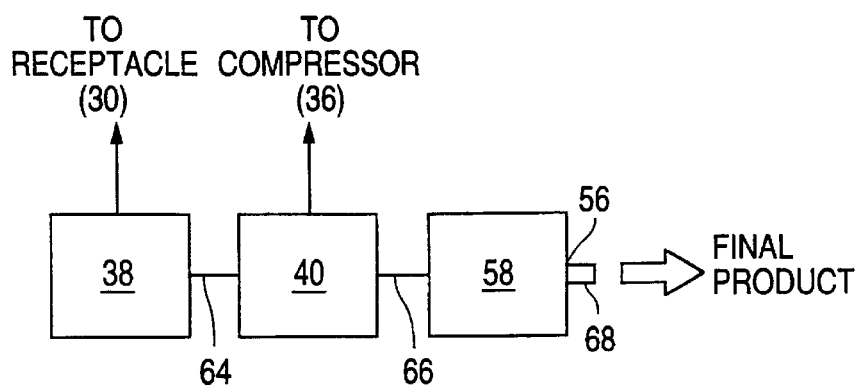

FIGS. 3 and 5 illustrate one embodiment of this apparatus: a means (4) for feeding the first solution to a first heating means (2); a first conduit (60) connecting the first heating means (2) to a first chamber (6); a second chamber (10) separated from the first chamber (6) by a first semi-permeable membrane (12); a cooling means (20) to cool a second solution, connected to the second chamber (10) by a second conduit (14) and connected to a third chamber (22) by a third conduit (62); a fourth chamber (24) separated from the third chamber (22) by a second semi-permeable membrane (26); a second heating means (38) connected to the fourth chamber (24) by a fourth conduit (28). Referring now to FIG. 5, the embodiment is shown where the fourth chamber (24) is connected to a fifth chamber (40) by a fifth conduit (64). A sixth conduit (68) is connected to fifth chamber (40), with an optional residual gas solute removal means (58) in between, to allow the final product to exits the apparatus.

Referring back to FIG. 3, another embodiment of the apparatus of the invention is shown, which further comprises a sixth chamber (42) separated from the aforementioned fifth chamber (40) by a third semi-permeable membrane (44). In this embodiment, the sixth conduit (68) would be connected the sixth chamber (42) instead of to the fifth chamber (40).

Figure 6:
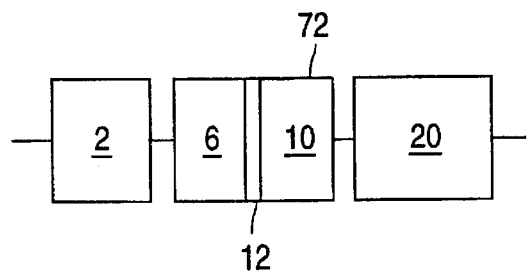

Alternately, one or more sets of chambers (adjacent chambers) can be combined to form single vessels. For example, instead of chambers (6) and (10), shown as separate vessels in FIG. 3, can be housed in a single vessel (72), as illustrated in FIG. 6. Vessel (72) is partitioned into two chambers (6) and (10) which are separated by solvent transfer means (12). Chambers (22) and (24), as well as chambers (40) and (42) could similarly be housed in single vessels.

The apparatus may further include one or more means for stirring or otherwise agitating solutions contained within the chambers so as to enhance osmotic flow. In addition, the apparatus may include a means for applying mechanical pressure to a solution contained within the sixth chamber, and thereby effect assisted forward osmosis of the solvent.

Accordingly, it is to be understood that the embodiments of the invention herein described are merely illustrative of the application of the principles of the invention. Reference herein to details of the illustrated embodiments are not intended to limit the scope of the claims, which themselves recite those features. It should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An osmotic method for the extraction of a solvent from a first solution, having a first solute difficult to separate from the solvent by passing said solvent through a series of intermediate solutions comprising the steps: (a) drawing said first solution into a first heat exchanger where said first solution is heated; (b) drawing said first solution into a first chamber, said chamber being divided by a first semi-permeable membrane from a saturated second solution having a second solute in a second chamber, wherein the solubility of said second solute is directly dependent upon the temperature of said second solution; (c) subjecting said first solution to forward osmosis, via said first semi-permeable membrane, in opposition to said second solution such that a net osmotic flow of said solvent takes place across said first semi-permeable membrane and into said second solution increasing its volume; (d) drawing said second solution from the second chamber into a second heat exchanger where it is cooled; (e) drawing said second solution into a third chamber, said chamber being divided by a second semi-permeable membrane from a third solution having a third solute in a fourth chamber, wherein the solubility of said third solute is inversely dependent upon the temperature of said third solution; (f) subjecting said second solution to forward osmosis, via said second semi-permeable membrane, in opposition to said third solution such that a net osmotic flow of said solvent takes place across said second semi-permeable membrane and into said third solution, increasing its volume; (g) drawing said third solution into a third heat exchanger where said third solution is heated; (h) drawing said third solution into a fifth chamber to provide for removal of any remaining third solute; and (i) collecting the third solution, now diluted, for use.

2. The method of claim 1 wherein said first solution is selected from the group consisting of seawater, brine, brackish water, mineralized water and industrial waste water.

3. The method of claim 2 wherein said first solute is a chemically precipitable soluble salt.

4. The method of claim 3 wherein said first solute is NaCl.

5. The method of claim 1 wherein said solvent is $H_2O$.

6. The method of claim 1 wherein said second solute is selected from the group consisting of $KNO_3$, $Na_3PO_4$ and sucrose.

7. The method of claim 6 wherein said second solute is $KNO_3$ and said second solution is a saturated $KNO_{3(aq)}$ solution.

8. The method of claim 1 wherein said third solute is selected from the group consisting of $SO_2$, $Ce(SO_4)_3$, and $CO_2$.

9. A The method of claim 1 wherein the fifth chamber is divided by a third semi-permeable membrane from a fourth solution having a fourth solute in a sixth chamber, and said method further comprises, prior to collecting the third solution, the steps of: (i) subjecting the third solution to forward osmosis by means of the third semi-permeable membrane, in opposition to the fourth solution such that a net osmotic flow of the solvent takes place across the third semi-permeable membrane and into the fourth solution, increasing its volume and diluting it; and (ii) collecting the fourth solution, now diluted, for use.

10. The method of claim 9 wherein said fourth solute is selected from the group consisting of fertilizers, vitamins, minerals, NaF, chlorine and water treatment additives.

11. The method of claim 1 further comprising the generation of energy wherein when at least one solution increases in volume due to net osmotic flow, said solution is allowed to overflow its chamber and the osmotic head is used to drive a hydroelectric turbine and potential energy is captured for use.

12. The method of claim 1 wherein said first solution is heated to about 60 to 100° C.

13. The method of claim 12 wherein said first solution is heated to about 100° C.

14. The method of claim 1 wherein said second solution is cooled to about 20 to 40° C.

15. The method of claim 14 wherein said second solution is cooled to about 30° C.

16. The method of claim 1 wherein said third solution is heated to about 60 to 100° C.

17. The method of claim 16 wherein said third solution is heated to about 100° C.

* * * * *